United States Patent
Kubota et al.

(10) Patent No.: US 9,164,705 B2
(45) Date of Patent: Oct. 20, 2015

(54) IMAGE FORMING APPARATUS AND RECORDING MEDIUM

(75) Inventors: Hajime Kubota, Kanagawa (JP); Daisuke Okada, Kanagawa (JP); Hideaki Matsui, Kanagawa (JP); Yuto Shibata, Kanagawa (JP)

(73) Assignee: Ricoh Company, LTD., Tokyo (JP)

( * ) Notice: Subject to any disclaimer, the term of this patent is extended or adjusted under 35 U.S.C. 154(b) by 0 days.

(21) Appl. No.: 13/601,479

(22) Filed: Aug. 31, 2012

(65) Prior Publication Data

US 2013/0057916 A1    Mar. 7, 2013

(30) Foreign Application Priority Data

Sep. 7, 2011  (JP) ................................. 2011-195376

(51) Int. Cl.
G06F 3/12    (2006.01)

(52) U.S. Cl.
CPC ............ *G06F 3/1204* (2013.01); *G06F 3/1208* (2013.01); *G06F 3/1258* (2013.01); *G06F 3/1285* (2013.01); *G06F 3/1262* (2013.01)

(58) Field of Classification Search
None
See application file for complete search history.

(56) References Cited

U.S. PATENT DOCUMENTS

| | | | | |
|---|---|---|---|---|
| 2003/0011812 A1* | 1/2003 | Sesek et al. | ................... | 358/1.15 |
| 2006/0232811 A1* | 10/2006 | Yokoyama | ................... | 358/1.14 |
| 2009/0303547 A1* | 12/2009 | Kurihara | ...................... | 358/3.28 |
| 2010/0177363 A1* | 7/2010 | Zhou | ............................ | 358/474 |

FOREIGN PATENT DOCUMENTS

| | | | |
|---|---|---|---|
| JP | 2003-127473 | | 5/2003 |
| JP | 2009110080 A | * | 5/2009 |

* cited by examiner

*Primary Examiner* — Ashish K Thomas
*Assistant Examiner* — Keara Harris
(74) *Attorney, Agent, or Firm* — Harness, Dickey & Pierce, P.L.C.

(57) ABSTRACT

An image forming apparatus includes an accumulating unit to accumulate documents, a document selecting unit to receive selection of the accumulated documents to be printed, a screen displaying unit to display on a display unit a printing condition setting screen including default values for selecting plural of the accumulated documents and a list of setting items when the selection received by the document selecting unit indicates plural of the accumulated documents, a reset receiving unit to receive selection of the setting item to be changed and resetting of a default value of the selected setting item, a reset control unit to change a content of the setting item into a resetting content when the setting item is resettable or allow the content to remain unchanged when the setting item is not resettable, and a printing unit to print the accumulated document, the setting item of which is reset.

4 Claims, 10 Drawing Sheets

| SETTING ITEMS | CHANGEABLE PRINTING CONDITIONS | | |
|---|---|---|---|
| | PDL1 | PDL2 | PDL3 |
| DOUBLE SIDED | ○ | ○ | ○ |
| SORT | ○ | ○ | ○ |
| STAPLE | ○ | ○ | ○ |
| PUNCH | ○ | ○ | ○ |
| TONER SAVE (MONOCHROME) | - | ○ | ○ |
| TONER SAVE (COLOR) | - | ○ | ○ |
| AGGREGATE -NUP- | - | - | ○ |
| AGGREGATE DIRECTION | - | - | ○ |
| AGGREGATE PARTITION LINE | - | - | ○ |
| COLOR/MONOCHROME | ○ | ○ | ○ |
| ROTATE 180 DEGREES | ○ | ○ | ○ |
| ⋮ | ⋮ | ⋮ | ⋮ |

FIG.7

| SETTING ITEMS | CHANGEABLE PRINTING CONDITIONS | | |
| --- | --- | --- | --- |
| | PDL1 | PDL2 | PDL3 |
| DOUBLE SIDED | ○ | ○ | ○ |
| SORT | ○ | ○ | ○ |
| STAPLE | ○ | ○ | ○ |
| PUNCH | ○ | ○ | ○ |
| TONER SAVE (MONOCHROME) | — | ○ | ○ |
| TONER SAVE (COLOR) | — | ○ | ○ |
| AGGREGATE –NUP– | — | — | ○ |
| AGGREGATE DIRECTION | — | — | ○ |
| AGGREGATE PARTITION LINE | ○ | ○ | ○ |
| COLOR/MONOCHROME | ○ | ○ | ○ |
| ROTATE 180 DEGREES | ○ | ○ | ○ |
| ... | ... | ... | ... |

FIG.8

| SETTING ITEMS | DEFAULT |
|---|---|
| SORT | SORT |
| STAPLE | NO STAPLE |
| PUNCH | NO PUNCH |
| COLOR/MONOCHROME | COLOR |
| SHEET SIZE | A4 |
| SHEET TYPE | STANDARD SHEET |
| ROTATE 180 DEGREES | NO ROTATION |

IMAGE FORMING APPARATUS AND RECORDING MEDIUM

BACKGROUND OF THE INVENTION

1. Field of the Invention

The disclosures herein generally relate to an image forming apparatus and a non-transitory recording medium storing a program.

2. Description of the Related Art

It is generally performed that documents accumulated in a storage device are retrieved at a desired time to print out the retrieved documents. When printing such accumulated documents, it may be necessary to have a selecting operation to select one or more accumulated documents desired for printing and a printing condition setting operation to set printing conditions of the selected documents.

For example, Japanese Laid-open Patent Publication No. 2003-127473 (hereinafter referred to as "Patent Document 1") discloses a technology generally known in the art in which documents accumulated in a storage device are retrieved for printing at a desired time. More specifically, Patent Document 1 discloses an image forming apparatus capable of retrieving document data to be printed at a desired time. The disclosed image forming apparatus includes a data storage unit to accumulate the document data, a printed history recording unit to record a history of the printed document data and a bibliographic information recording unit to record a recognition code for specifying the document data and bibliographic information. In the image forming apparatus disclosed in Patent Document 1, document selection and printing conditions may be set based on the printed history information at a desired position acquired from the printed history information recorded by the printed history recording unit.

RELATED ART DOCUMENT

Patent Document

Patent Document 1: Japanese Laid-open Patent Publication No. 2003-127473

The aforementioned image forming apparatus accumulates bit map data (image data) of a raster image converted by a raster image processor (RIP) processing from vector image page description language (PDL) data as accumulated documents. The accumulated documents after the RIP processing have common settable printing conditions. Thus, the printing conditions may be simultaneously set for the accumulated documents after the RIP processing.

However, the accumulated documents stored as PDL data may have different settable printing conditions according to types of the PDL data. That is, a certain printing condition may be settable for the accumulated documents stored as one type of the PDL data; however, this printing condition may not be settable for the accumulated documents stored as another type of the PDL data.

SUMMARY OF THE INVENTION

Accordingly, it is a general object of at least one embodiment of the present invention to provide an information processing apparatus, an information processing system, and a computer-readable recording medium storing a program, which are capable of providing location free advantages while ensuring an appropriate security level as well as substantially eliminating one or more problems caused by the limitations and disadvantages of the related art.

It is a general object of at least one embodiment of the present invention to provide an image forming apparatus and a non-transitory recording medium storing a program capable of simultaneously setting printing conditions of accumulated documents, which substantially eliminate one or more problems caused by the limitations and disadvantages of the related art.

According to an embodiment, there is provided an image forming apparatus that includes an accumulating unit configured to accumulate two or more documents; a document selecting unit configured to receive selection of one or more accumulated documents subject to being printed from the two or more accumulated documents accumulated in the accumulating unit; a screen displaying unit configured to display on a display unit a printing condition setting screen including default values for selecting two or more accumulated documents and a list of setting items when the selection received by the document selecting unit indicates two or more accumulated documents; a reset receiving unit configured to receive selection of at least one of the setting items subject to being changed and resetting of a default value of the selected setting item; a reset control unit configured to change a content of the selected setting item into a resetting content when the selected setting item of the accumulated document is resettable or configured to allow the content of the selected setting item to remain unchanged when the selected setting item of the accumulated document is not resettable, the resetting of the default value for the selected setting item being received by the reset receiving unit; and a printing unit configured to print the accumulated document, the setting item of the accumulated document being reset.

According to another embodiment, there is provided a non-transitory computer-readable recording medium including a program, which, when processed by a processor, causes an image forming apparatus to function as an accumulating unit configured to accumulate two or more documents; a document selecting unit configured to receive selection of one or more accumulated documents subject to being printed from the two or more accumulated documents accumulated in the accumulating unit; a screen displaying unit configured to display on a display unit a printing condition setting screen including default values for selecting two or more accumulated documents and a list of setting items when the selection received by the document selecting unit indicates two or more accumulated documents; a reset receiving unit configured to receive selection of at least one of the setting items subject to being changed and resetting of a default value of the selected setting item; a reset control unit configured to change a content of the selected setting item into a resetting content when the selected setting item of the accumulated document is resettable or configured to allow the content of the selected setting item to remain unchanged when the selected setting item of the accumulated document is not resettable, the resetting of the default value for the selected setting item being received by the reset receiving unit; and a printing unit configured to print the accumulated document, the setting item of the accumulated document being reset.

Additional objects and advantages of the embodiments will be set forth in part in the description which follows, and in part will be obvious from the description, or may be learned by practice of the invention.

It is to be understood that both the foregoing general description and the following detailed description are exemplary and explanatory only and are not restrictive of the invention, as claimed.

BRIEF DESCRIPTION OF THE DRAWINGS

Other objects and further features of embodiments will be apparent from the following detailed description when read in conjunction with the accompanying drawings, in which:

FIG. 7 is an explanatory diagram illustrating one example of settable setting items for each PDL data format;

FIG. 8 is an explanatory diagram illustrating one example of predetermined default values and setting items for selecting documents;

DESCRIPTION OF THE PREFERRED EMBODIMENTS

Preferred embodiments are described below with reference to the accompanying drawings. Note that a printer is an example of an image forming apparatus in the following embodiments. The image forming apparatus may be any apparatuses having a printer function such as a multifunctional peripheral, a facsimile machine, and a copier.

Configuration

Figure 1:
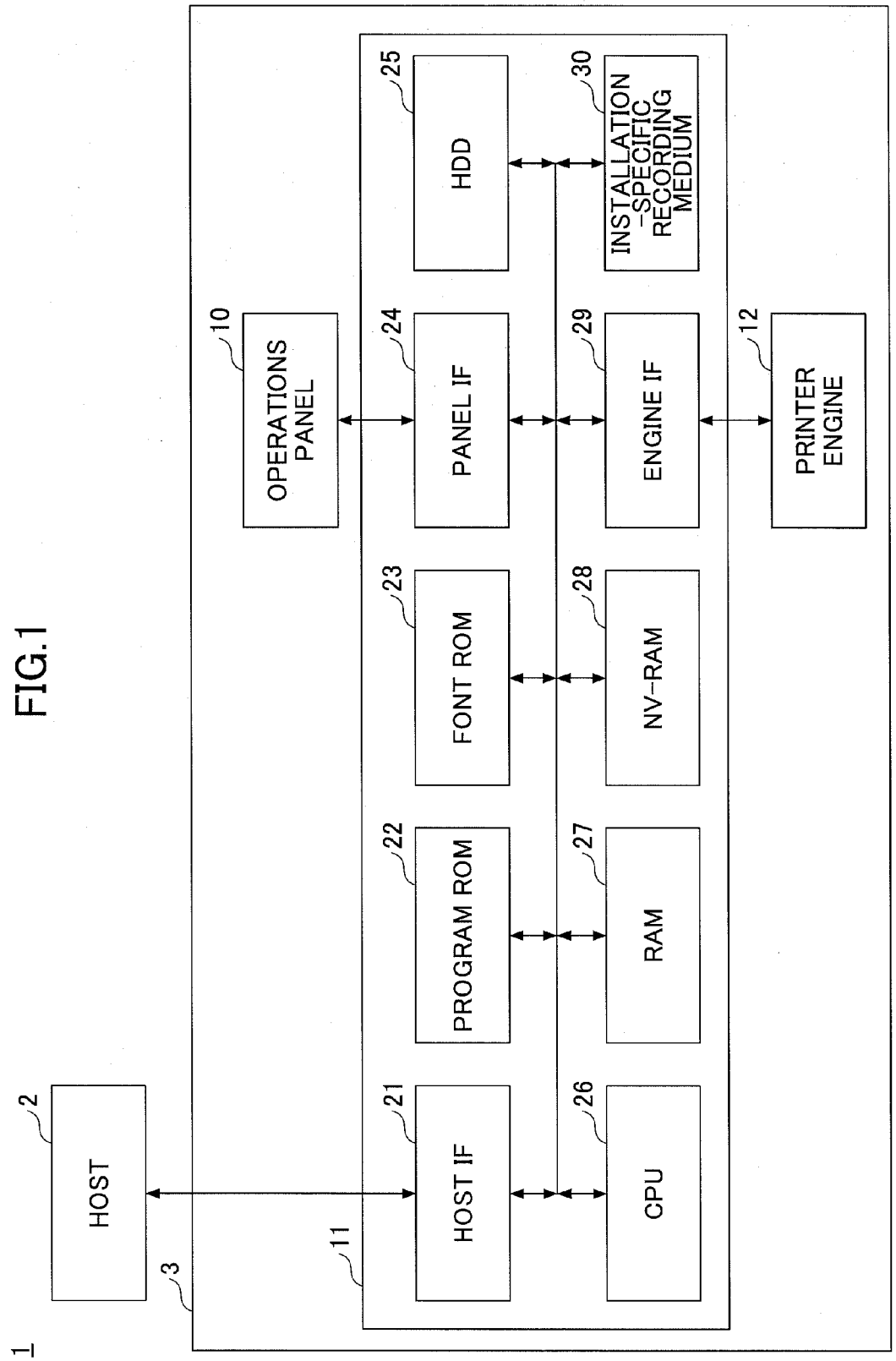
FIG. 1 is a configuration diagram illustrating an example of a printing system.

FIG. 1 is a configuration diagram illustrating an example of a printing system. A printing system 1 includes a host 2 and a printer 3 that are connected with each other so as to communicate data between them. The host 2 and the printer 3 may be connected via a network such as a LAN.

The printer 3 includes an operations panel 10, a controller 11 and a printer engine 12. The operations panel 10 includes a display part indicating a status of the printer 3 and a switching part for switching modes or fonts of the printer 3. The controller 11 is a generic name for a control mechanism that is configured to convert printing data from the host 2 into video data and output the converted video data to the printer engine 12 based on a set mode and control data from the host 2. The printer engine 12 is configured to form an electrostatic latent image on a photoreceptor based on the video data and the control data from the controller 11, develop the latent image, feed a transfer sheet from a feeder part, transfer the developed image to the transferred sheet and fix the developed image to the transferred sheet. An image is thus formed on the transferred sheet.

The controller 11 may, for example, be formed of modules illustrated in FIG. 1. The controller 11 in FIG. 1 includes a host interface (IF) 21, a program read-only memory (ROM) 22, a font read-only memory (ROM) 23, a panel interface (IF) 24, a hard disk drive (HDD) 25, a central processing unit (CPU) 26, a random access memory (RAM) 27, a non-volatile random access memory (NV-RAM) 28 and an engine interface (IF) 29.

The host IF 21 serves as an interface for transmitting the control data and the printing data from the host 2 to the printer 3 and also serves as an interface for transmitting a status signal from the printer 3 to the host 2. The program ROM 22 stores programs for managing data and controlling peripheral modules within the controller 11. The font ROM 23 stores various kinds of fonts utilized for printing.

The panel IF 24 serves as an interface for transmitting signals to switch statuses, modes, fonts and the like of the printer 3. The HDD 25 is an example of a storage unit that stores the printing data of the printer 3. The CPU 26 is configured to perform processing on data (printing data and control data) from the host 2 based on the programs stored in the program ROM 22.

The RAM 27 serves as a working memory when the CPU 26 performs the aforementioned processing. The RAM 27 also serves as a buffer configured to manage the printing data from the host 2 per page unit and temporarily store the printing data managed per page unit. Further, the RAM 27 is configured to assist converting the printing data buffered in the RAM 27 into actual printing patterns and serves as a bit map memory or the like to store the video data (image data).

The NV-RAM 28 is a nonvolatile RAM utilized for retaining data or the like when the power is switched off. The engine IF 29 serves as an interface for transmitting the control data and the video data from the controller 11 to the printer engine 12, and serves as an interface for transmitting status data from the printer engine 12 to the controller 11.

The CPU 26 separates the printing data, the control data and other data from the data transmitted via the host IF 21 from the host 2. Note that the printing data and the control data are converted into control codes and the converted control codes are buffered in the RAM 27. When the printing instructions from the host 2 or the printing data received from the host 2 exceed one page, the controller 11 initially converts interconnecting codes (i.e., the control codes) into video data. Having completed the conversion of the intermediate codes into the video data, the controller 11 outputs a print start instruction to the printer engine 12 via the engine IF 29.

Thus, the printing data from the host are printed by the printer engine 12 according to the aforementioned sequential flow. Note that the printing data designated for accumulation are accumulated in the HDD 25. In order to reprint the printing data, a user selects desired printing data using the operations panel 10 to restart printing.

Note that the controller 11 may include an installation-specific recording medium (hereinafter simply called a "recording medium") 30. The recording medium 30 may be removable or may be connected via a socket or the like. Various kinds of programs for controlling the printer 3 may be provided via distribution of the recording medium 30 or may be downloaded via a network or the like.

As the recording medium 30, various types of recording media may be used. Examples of such recording media include a CD-ROM, a flexible disk and a magneto-optical disk on which information is optically, electrically or magnetically recorded; or a semiconductor memory such as a read-only memory (ROM) or a flash memory on which information is electrically recorded. The programs are installed from the recording medium 30 into the HDD 25. The programs downloaded from the network or the like are also installed into the HDD 25.

The HDD 25 stores the programs, desired files, data and the like. The programs installed in the HDD 25 are retrieved and loaded in the RAM 27 when the system is started. The CPU 26 implements various types of processing in accordance with the programs loaded in the RAM 27.

Processing

Figure 2:
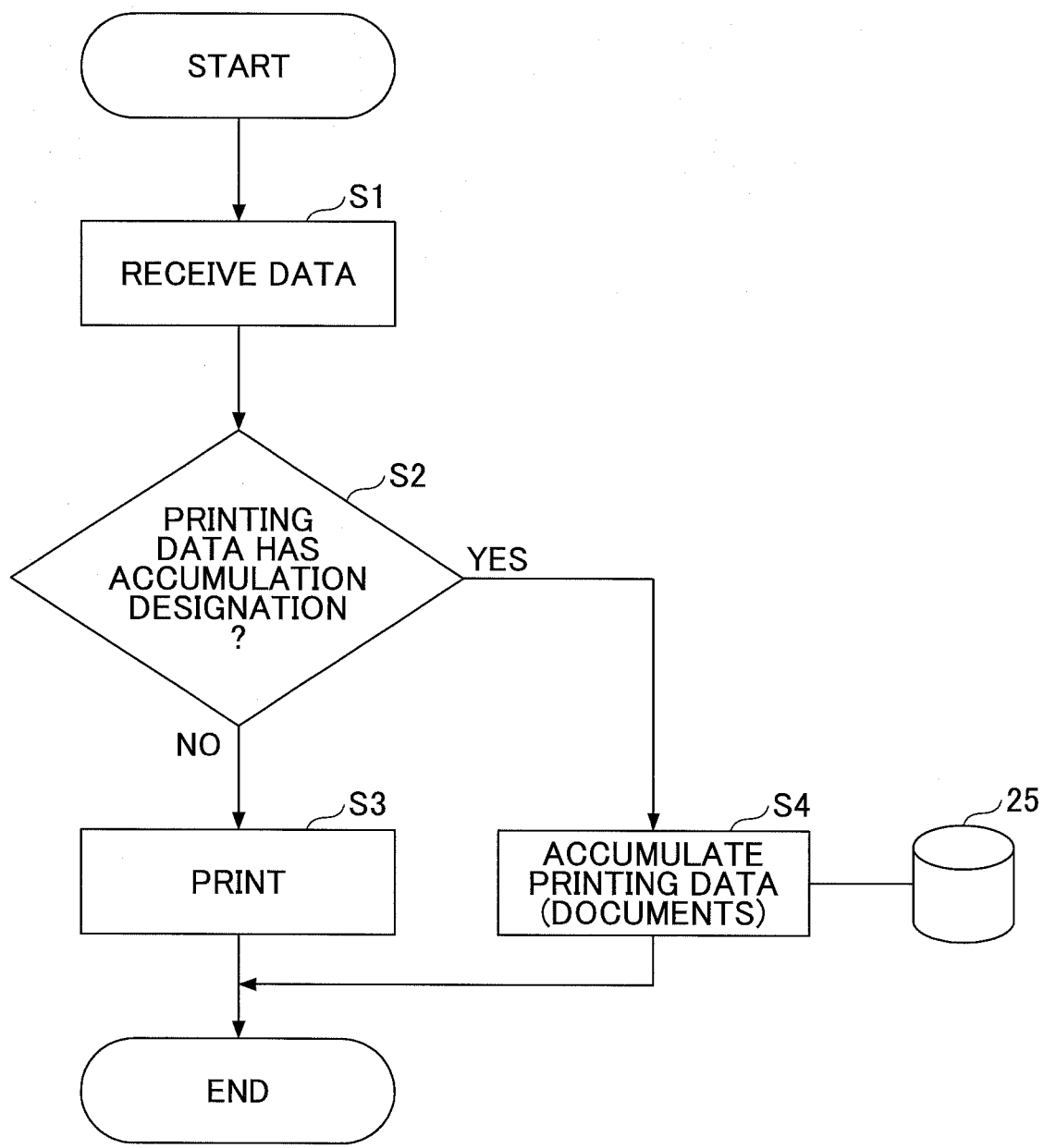
FIG. 2 is a flowchart illustrating an example of processing when printing data are received.

FIG. 2 is a flowchart illustrating an example of processing when printing data are received. In step S1, the printer 3 receives printing data from the host 2. In step S2, the controller 11 determines whether the printing data have accumulation designation. If the printing data have no accumulation designation, step S3 is processed where the controller 11 causes the printer engine 12 to print the printing data as described above.

If, on the other hand, the printing data have accumulation designation, step S4 is processed where the controller 11 accumulates the printing data into the HDD 25. Note that FIG. 2 illustrates a case where the controller 11 will not allow the printer engine 12 to print the printing data having an accumulation designation. However, the controller 11 may allow the printer engine 12 to print the printing data having the accumulation designation and accumulate the printing data after the printing data have been printed. There are two types of methods for accumulating the printing data as described below.

Figure 3:
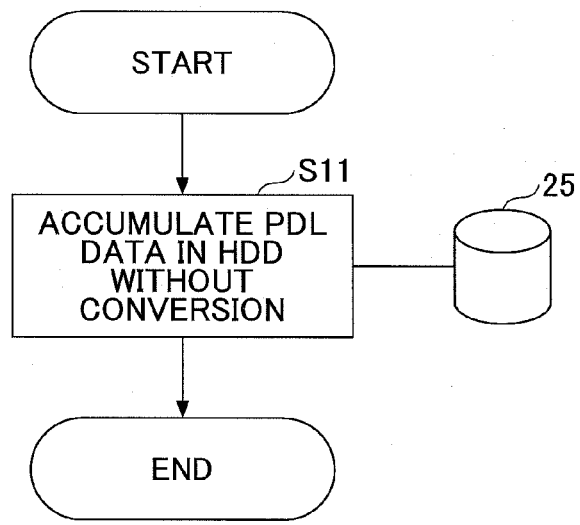
FIG. 3 is a flowchart illustrating an example of a first method for accumulating printing data.

FIG. 3 is a flowchart illustrating an example of a first method for accumulating printing data. In step S11, the controller 11 accumulates the received printing data in the PDL data format (hereinafter also called "PDL data") in the HDD 25 without conversion.

Figure 4:
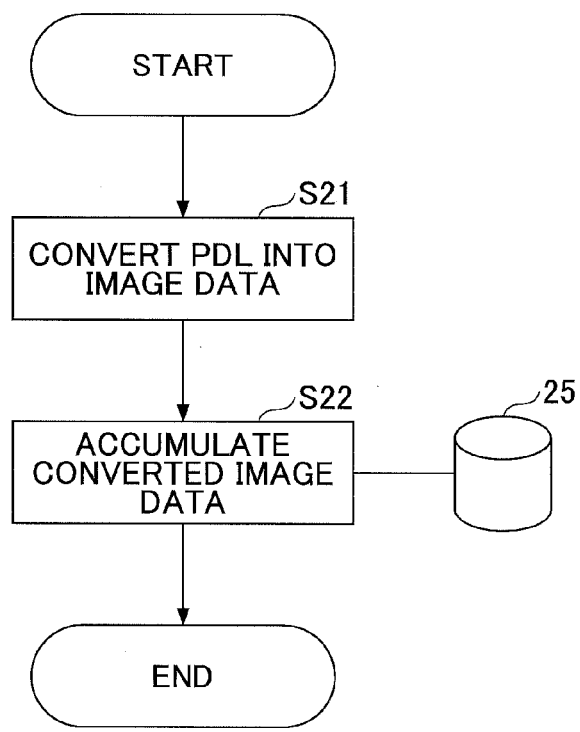
FIG. 4 is a flowchart illustrating an example of a second method for accumulating printing data.

FIG. 4 is a flowchart illustrating an example of a second method for accumulating printing data. In step S21, the controller 11 performs raster image processor (RIP) processing on the PDL data to convert the PDL data into image data. In step S22, the controller 11 accumulates the converted image data into the HDD 25. In this embodiment, accumulation of printing data by the first method illustrated in FIG. 3 is preconditioned. In this embodiment, the PDL data accumulated in the HDD 25 by the first method for accumulating printing data are called "accumulated documents".

Figure 5:
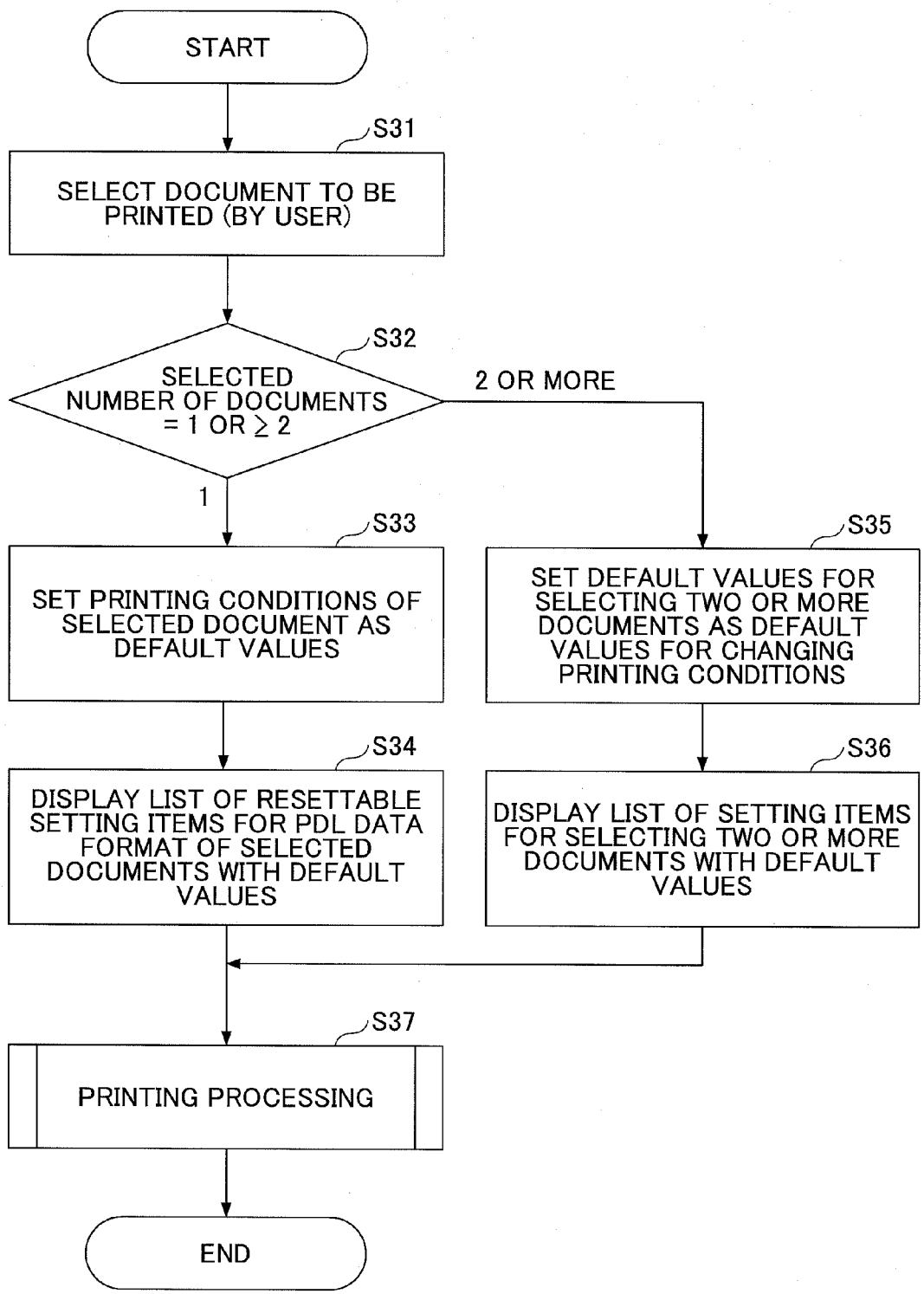
FIG. 5 is a flowchart illustrating an example of an accumulated document printing procedure.

FIG. 5 is a flowchart illustrating an example of an accumulated document printing procedure. In step S31, the user selects the accumulated documents desired to be printed by operating the operations panel 10, the host 2, the Web and the like. The controller 11 receives selection of the accumulated documents to be printed from the user.

In step S32, the controller 11 determines whether the number of the accumulated documents selected by the user to be printed is either one or two or more. If the number of documents selected by the user to be printed is one, step S33 is processed where the controller 11 sets printing conditions of the accumulated document as default values for changing the printing conditions. Subsequently, step S34 is processed where the controller 11 displays a list of settable setting items for the PDL data format of the accumulated document to be printed together with the default values set in step S33.

If, on the other hand, the number of documents selected by the user to be printed is two or more in step S32, step S35 is processed where the controller 11 sets printing conditions for selecting two or more accumulated documents as default values for changing the printing conditions. Subsequently, step S36 is processed where the controller 11 displays a list of setting items for selecting two or more documents together with the default values set in step S35. Having performed processing in step S34 or S36, the controller 11 performs the following printing processing in step S37.

Figure 6:
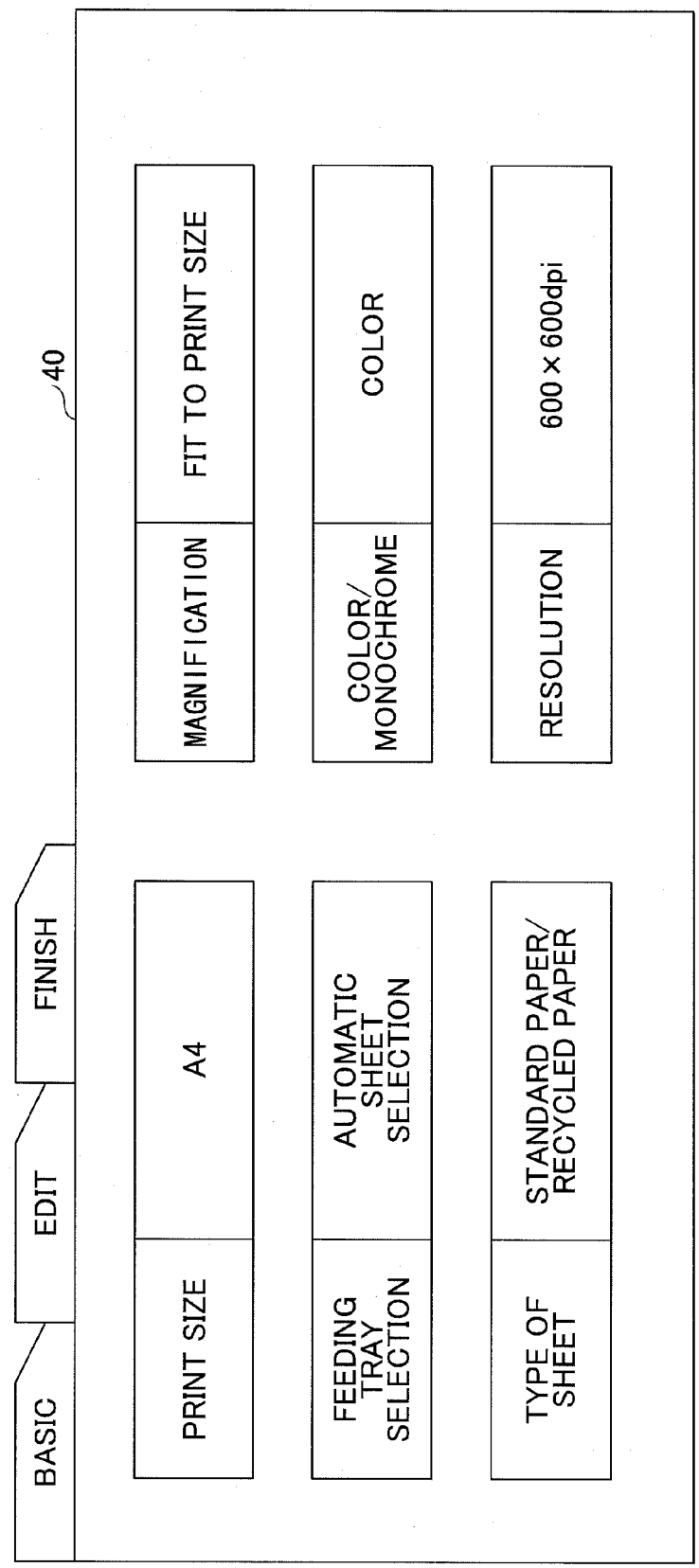
FIG. 6 is a conceptual diagram illustrating an example of a printing condition setting screen displayed on an operations panel.

FIG. 6 is a conceptual diagram illustrating an example of a printing condition setting screen displayed on the operations panel 10. A printing condition setting screen 40 displays examples of setting items including print size, feeding tray selection, type of sheet, magnification, color/monochrome, and resolution. Further, the printing condition setting screen 40 displays default values of the above setting items, which are "A4", "automatic sheet selection", "standard paper/recycled paper", "fit to print size", "color", and "600×600 dpi". The user optionally changes the above default values of the setting items on the printing condition setting screen 40 and then initiates a printing operation.

FIG. 7 is an explanatory diagram illustrating one example of settable setting items for each PDL data format. In the example of FIG. 7, the setting items that may be set for each PDL data format are provided with "o". In the example of FIG. 7, the setting items that may be set for the accumulated documents per PDL data format are displayed with "o" or "-" as changeable printing conditions. For example, if the PDL data format of the accumulated document selected by the user is "PDL2", the setting items that may be set for the accumulated document include the setting items other than "aggregate", "aggregate direction" or "aggregate partition line".

Note that if the PDL data format of the accumulated document selected by the user is "PDL2", the print condition setting screen illustrated in FIG. 6 displays the setting items other than "aggregate", "aggregate direction" and "aggregate partition line". That is, the setting items "aggregate", "aggregate direction" and "aggregate partition line" are not settable. Further, if the PDL data format of the accumulated document selected by the user is "PDL3", the print condition setting screen illustrated in FIG. 6 displays the setting items including "aggregate", "aggregate direction" and "aggregate partition line". That is, the setting items "aggregate", "aggregate direction" and "aggregate partition line" are settable.

In step S32, when the number of the accumulated documents selected by the user to be printed is two or more, the printing condition setting screen may need to be generated based on the following considerations. For example, different default values may be set for the same setting item for the accumulated documents selected by the user to be printed. Further, a range of the setting items may vary due to different PDL formats (e.g., "PDL1", "PDL2" in FIG. 7) of the accumulated documents selected by the user to be printed.

Accordingly, in this embodiment, predetermined default values for selecting two or more documents may be set as default values for changing the printing conditions. In addition, a predetermined list of setting items for selecting two or more documents may be set as a range of the setting items for changing printing conditions.

FIG. 8 is an explanatory diagram illustrating one example of predetermined default values and setting items for selecting documents. In FIG. 8, the setting items and the default values for selecting two or more documents are associated with each other.

Figure 9:
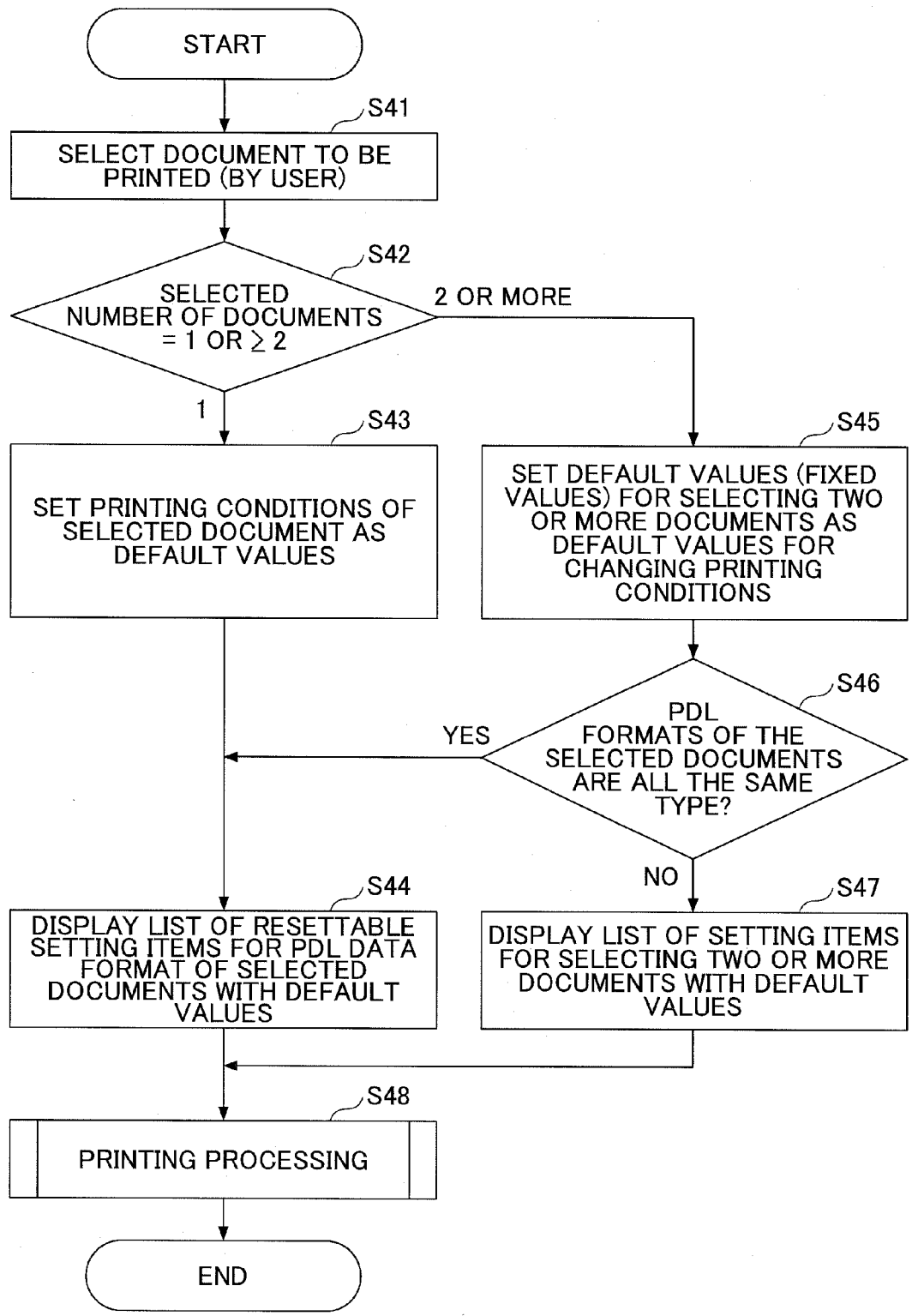
FIG. 9 is a flowchart illustrating another example of the accumulated document printing procedure.

FIG. 9 is a flowchart illustrating another example of the accumulated document printing procedure. FIG. 9 is an example of such a procedure in which when the number of the accumulated documents selected by the user to be printed is two or more and the selected documents are formed in different PDL data formats, the setting items and the default values illustrated in FIG. 8 are utilized. Note that the flowchart of FIG. 9 is similar to that of FIG. 5 except for a part of the flowchart.

In step S41, the controller 11 receives selection of the accumulated documents to be printed from the user. In step S42, the controller 11 determines whether the number of the accumulated documents selected by the user to be printed is either one or two or more. If the number of documents selected by the user to be printed is one, step S43 is processed where the controller 11 sets printing conditions of the accumulated document as default values for changing the printing conditions. Subsequently, step S44 is processed where the controller 11 displays a list of settable setting items for the PDL data format of the accumulated document to be printed together with the default values set in step S43.

If, on the other hand, the number of documents selected by the user to be printed is two or more in step S42, step S45 is processed where the controller 11 sets printing conditions for selecting two or more accumulated documents as default values for changing the printing conditions.

Subsequently, step S46 is processed where the controller 11 determines whether the PDL formats (PDL data type) of the selected accumulated documents displayed are all the same type. If the PDL data formats of the selected accumulated documents are all the same type ("YES" in step S46), step S44 is processed where the controller 11 displays a list of settable setting items for the PDL data format of the accumulated documents to be printed together with the default values set in step S45.

If the PDL data formats of the selected accumulated documents are different types ("NO" in step S46), step S47 is processed where the controller 11 displays a list of setting items for selecting two or more documents together with the default values set in step S45. Thereafter, having performed processing in step S44 or S47, the controller 11 performs the following printing processing in step S48.

Figure 10:
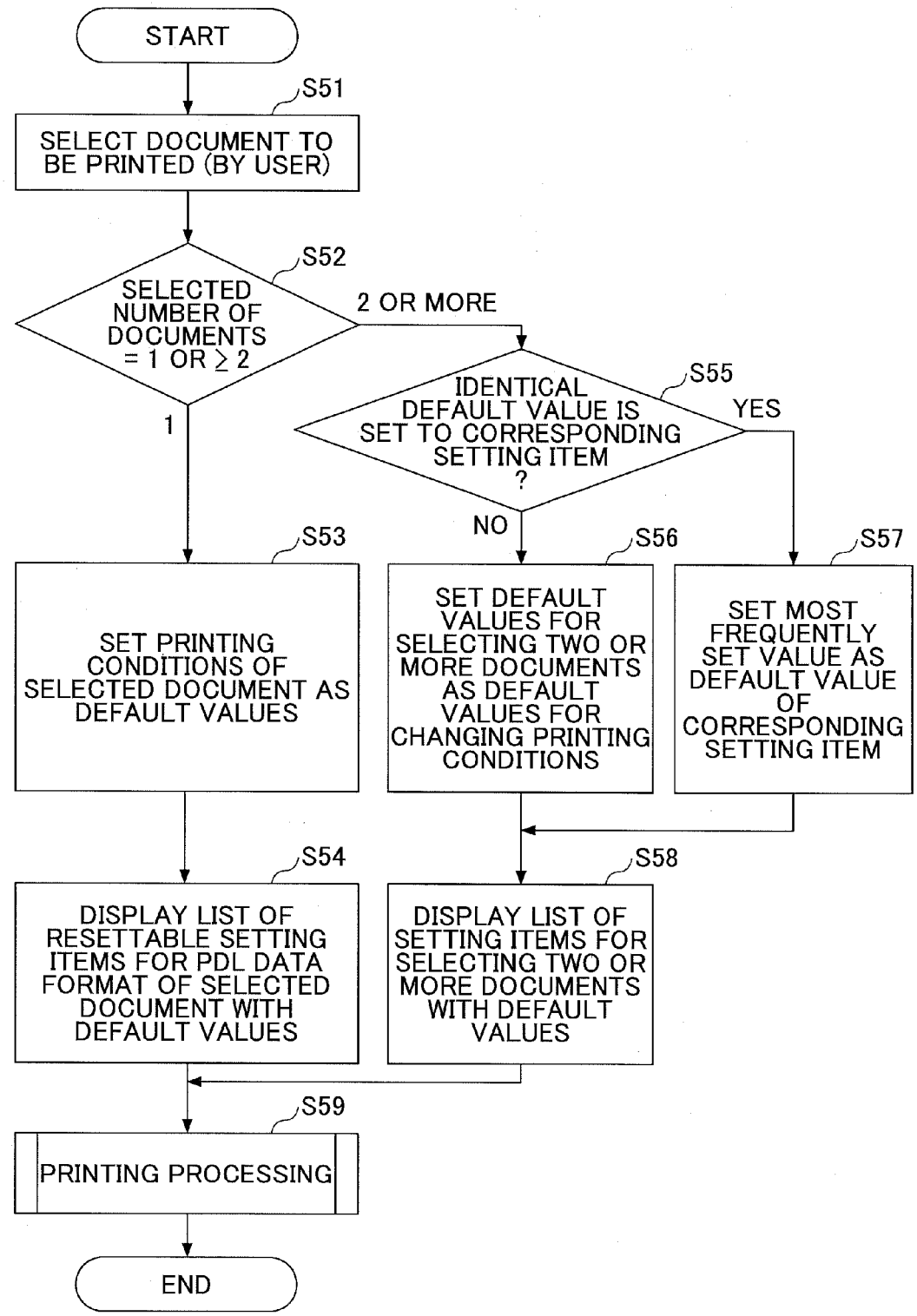
FIG. 10 is a flowchart illustrating another example of the accumulated document printing procedure.

FIG. 10 is a flowchart illustrating another example of the accumulated document printing procedure. FIG. 10 is an example of such a procedure in which the most frequently set default value in each of the setting items common between the selected two or more accumulated documents is set as a default value of the corresponding setting item. Note that the flowchart of FIG. 10 is similar to that of FIG. 5 except for a part of the flowchart.

In step S51, the controller 11 receives selection of the accumulated documents to be printed from the user. In step S52, the controller 11 determines whether the number of the accumulated documents selected by the user to be printed is either one or two or more. If the number of documents selected by the user to be printed is one, step S53 is processed where the controller 11 sets printing conditions of the accumulated document as default values for changing the printing conditions. Subsequently, step S54 is processed where the controller 11 displays a list of settable setting items for the PDL data format of the accumulated document to be printed together with the default values set in step S53.

If, on the other hand, the number of documents selected by the user to be printed is two or more in step S52, the controller 11 processes step S55. The controller 11 determines whether an identical default value is set for a corresponding one of the setting items between the selected two or more accumulated documents.

If the identical value is not set for each of the setting items between the selected two or more accumulated documents ("NO" in step S55), step S56 is processed where the controller 11 sets a default value for selecting two or more documents as a default value for changing the printing conditions. If, on the other hand, the identical value is set for the corresponding setting item for the selected two or more accumulated documents ("YES" in step S55), step S57 is processed where the controller 11 sets the most frequently set default value as a default value of the corresponding item. Subsequently, step S58 is processed after step S56 or S57, where the controller 11 displays a list of setting items for selecting two or more documents together with the default values set in step S56 or S57. Thereafter, having performed processing in step S54 or S58, the controller 11 performs the following printing processing in step S59.

Figure 11:
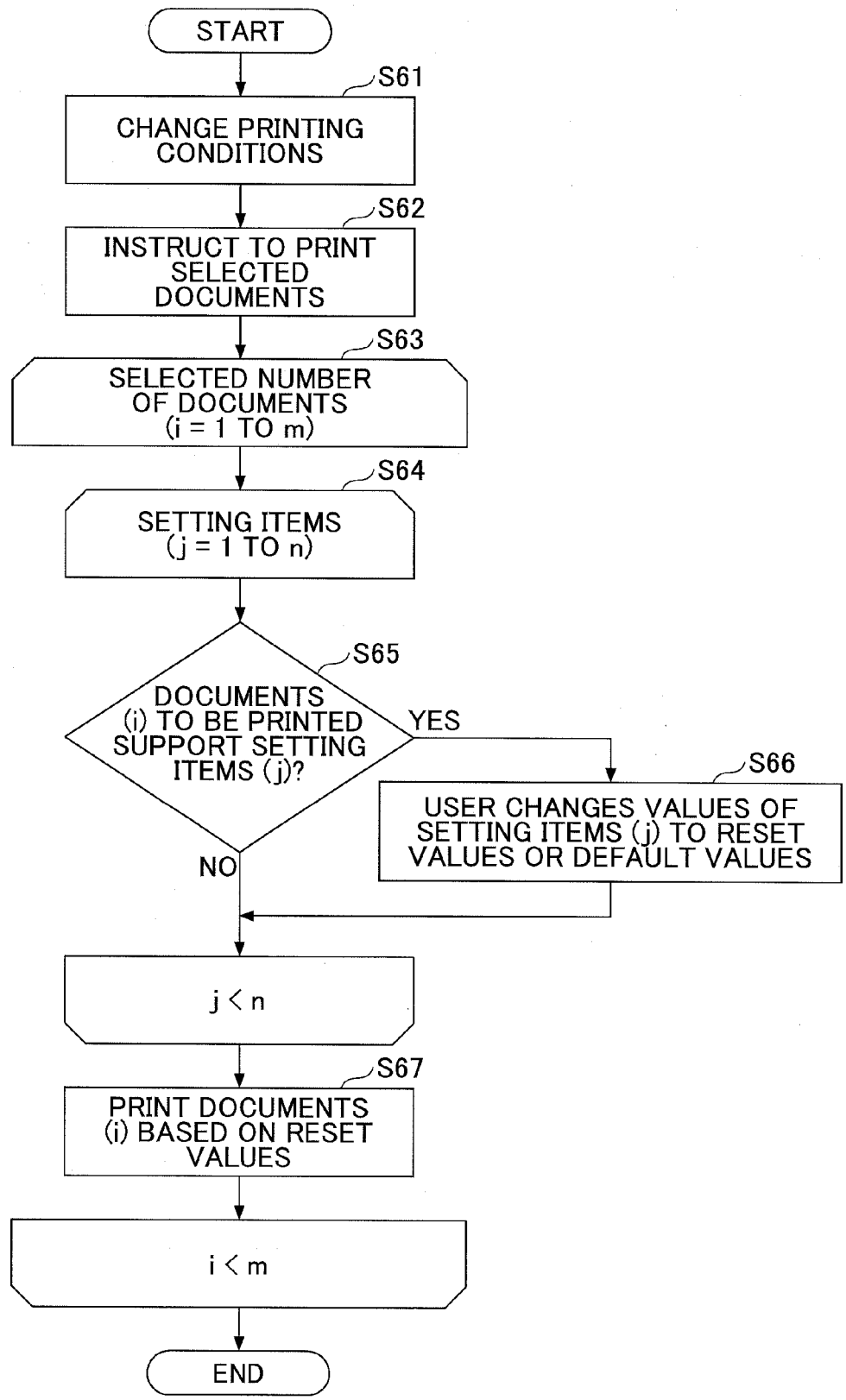
FIG. 11 is a flowchart illustrating an example of a printing procedure.

Printing processing of step S37 of FIG. 5, step S48 of FIG. 9 and step S59 of FIG. 10 may be carried out according to a flowchart illustrated in FIG. 11. FIG. 11 is a flowchart illustrating an example of a printing procedure.

In step S61, the user selects a setting item that the user desires to change from the list of the setting items to reset (change) the printing conditions. The controller 11 receives the change of the printing conditions from the user.

In step S62, the user instructs the controller 11 to print the selected accumulated documents. The controller 11 receives the instruction to print the accumulated documents from the user. The printer 3 sequentially prints the accumulated documents of which the printing instructions are received from the user. In step S63, the controller 11 selects each of the accumulated documents i (i=1 to m) for which the printing instruction is received.

Further, in step S64, the controller 11 selects each of the setting items j (j=1 to n). In step S65, the controller 11 determines whether the accumulated document i of the PDL data format supports each of the setting items j.

If the accumulated document i supports the corresponding setting item j ("YES" in step S65), the controller 11 changes the value of the setting item j to a value reset by the user or a default value. Note that if the accumulated document i does not support the corresponding setting item j ("NO" in step S65), the controller 11 does not carry out processing of step S66. Processing in steps S65 and S66 are carried out for each of the setting items j. After having carried out processing of steps S65 and S66 for all the setting items j, the controller 11 causes the printer engine 12 to print out the accumulated document i based on the reset printing condition in step S67.

Further, processing in steps S64 through S67 are carried out for each of the accumulated documents i. The controller 11 may cause the printer engine 12 to print out all the accumulated documents i according to the printing processing illustrated in FIG. 11.

The accumulated document i is printed out by reflecting each of the reset values to a corresponding one of the setting items j. If the PDL data format of the accumulated document i does not support the reset setting items, the reset setting items are invalidated and the reset values are not reflected. If two or more accumulated documents i accumulated in the PDL data format are selected for printing, predetermined default values for selecting two or more documents and the setting items are set. Hence, even when two or more accumulated documents i are selected for simultaneous printing (same print command), the settings of the printing conditions for the simultaneous printing may be enabled by ignoring the setting items that are invalid in the PDL data format of the accumulated documents i in actual printing processing.

Note that when the PDL data format of the accumulated document i to be printed does not support one of the reset setting items, the controller 11 may invalidate all the setting items except for the setting item of the color/monochrome setting. Since the setting item of the color/monochrome setting includes charging information (i.e., accounting information), it is preferable to configure the setting item of the color/monochrome setting to be selected by the user at all times.

Overview

According to the embodiments, settings of printing conditions for accumulated documents in a PDL format may be simultaneously changed by changing at least one predetermined common setting item for selecting two or more accumulated documents while invalidating a setting item that is unchangeable at a time of printing.

According to the embodiments, there are provided an image forming apparatus and a non-transitory recording medium storing a program that are capable of simultaneously setting printing conditions for accumulated documents.

Note that any elements, expressions, or combinations, as appropriate, of the aforementioned constituting elements and so forth applied to a method, device, system, computer program, recording medium, and the like are all effective as and encompassed by the embodiments of the present invention.

The present invention is not limited to the embodiments disclosed above, and various modifications and alterations may be made within the scope of the inventions described in the claims.

Note that an accumulating unit described in claims corresponds to the HDD 25. A document selecting unit in the claims is configured to carry out processing in step S31. A screen displaying unit in the claims is configured to carry out processing in steps S32 to S36. A reset receiving unit in the claims is configured to carry out processing in steps S61 to S62. A reset control unit in the claims is configured to carry out processing in steps S63 to S66. A printing unit in the claims is configured to carry out processing in step S67.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority or inferiority of the invention. Although the embodiment of the present invention has been described in detail, it should be understood that various changes, substitutions, and alterations could be made hereto without departing from the spirit and scope of the invention.

This patent application is based on Japanese Priority Patent Application No. 2011-195376 filed on Sep. 7, 2011, the entire contents of which are hereby incorporated herein by reference.

What is claimed is:

1. An image forming apparatus comprising:
    an storage unit configured to,
        store a plurality of document data sets, each of the document data sets being stored with associated printing conditions of a corresponding one of the document data sets, wherein at least one of the stored plurality of document data sets is selected,
        store for each document data set, items of the associated printing conditions allowed to be changed according to a type of each of the document data sets, and
        store, when two or more documents sets are selected, respective items of the printing condition to be displayed on a display unit in association with initial values for the items of the printing condition of the selected document data set, for each of the selected document data sets;
    a document selecting unit configured to receive the selection of the at least one document data sets stored in the storage unit;
    a display control unit configured to display on a display unit, wherein
        when the document selecting unit receives selection of one document data set, the items of the printing conditions stored in association with a corresponding type of the selected document data set in the storage unit, the items of the printing conditions being displayed as settable items, to set the printing conditions stored in association with the selected document data set as initial values of the displayed items of the printing conditions, and the set initial values being displayable, and
        when the document selecting unit receives selection of two or more document data sets, the items of the printing conditions of each of the selected two or more document data sets stored in the storage unit, the items of the printing conditions being displayed as settable items, to set the initial values stored in association with the items of the printing conditions in the storage unit to the displayed items of the printing conditions, and the set initial values being displayable on the display unit;
    a second receiving unit configured to receive a change in the printing conditions displayed on the display unit; and
    a printing unit configured to execute printing based on the change in the printing conditions received by the second receiving unit,
    wherein the display control unit is configured to display on the display unit a printing condition setting screen including default values for selecting two or more of the document data sets and the settable items when the selection received by the document selecting unit indicates two or more document data sets and types of the two or more document data sets are identical.

2. The image forming apparatus as claimed in claim 1, wherein
    the display control unit is configured to display on the display unit a printing condition setting screen including the default values for selecting two or more of the document data sets and the settable items when the selection received by the document selecting unit indicates two or more of the document data sets and identical default values are not set for the settable items of the two or more document data sets, and wherein the display control unit is configured to display on the display unit the printing condition setting screen including most frequently set default values and the settable items when the selection received by the document selecting unit indicates two or more document data sets and identical default values are set for the settable items of the two or more the document data sets.

3. The image display panel as claimed in claim 1, wherein the document data sets are printing data in a PDL data format.

4. A non-transitory computer-readable recording medium comprising a program, which, when processed by a processor, causes an image forming apparatus to function as:
    an storage unit configured to,
        store a plurality of document data sets, each of the document data sets being stored with associated printing conditions of a corresponding one of the document data sets, wherein at least one of the stored plurality of document data sets is selected,
        store for each document data set, items of the associated printing conditions allowed to be changed according to a type of each of the document data sets, and
        store, when two or more documents sets are selected, respective items of the printing condition to be displayed on a display unit in association with initial values for the items of the printing condition of the selected document data set, for each of the selected document data sets;

a document selecting unit configured to receive the selection of the at least one document data sets stored in the storage unit;

a display control unit configured to display on a display unit, wherein when the document selecting unit receives selection of one document data set, the items of the printing conditions stored in association with a corresponding type of the selected document data set in the storage unit, the items of the printing conditions being displayed as settable items, to set the printing conditions stored in association with the selected document data set as initial values of the displayed items of the printing conditions, and the set initial values being displayable, and when the document selecting unit receives selection of two or more document data sets, the items of the printing conditions of each of the selected two or more document data sets stored in the storage unit, the items of the printing conditions being displayed as settable items, to set the initial values stored in association with the items of the printing conditions in the storage unit to the displayed items of the printing conditions, and the set initial values being displayable on the display unit;

a second receiving unit configured to receive a change in the printing conditions displayed on the display unit; and a printing unit configured to execute printing based on the change in the printing conditions received by the second receiving unit, wherein the display control unit is configured to display on the display unit a printing condition setting screen including default values for selecting two or more of the document data sets and the settable items when the selection received by the document selecting unit indicates two or more document data sets and types of the two or more document data sets are identical.

* * * * *